(No Model.)
A. FYRBERG.
BICYCLE.
No. 507,116. Patented Oct. 24, 1893.
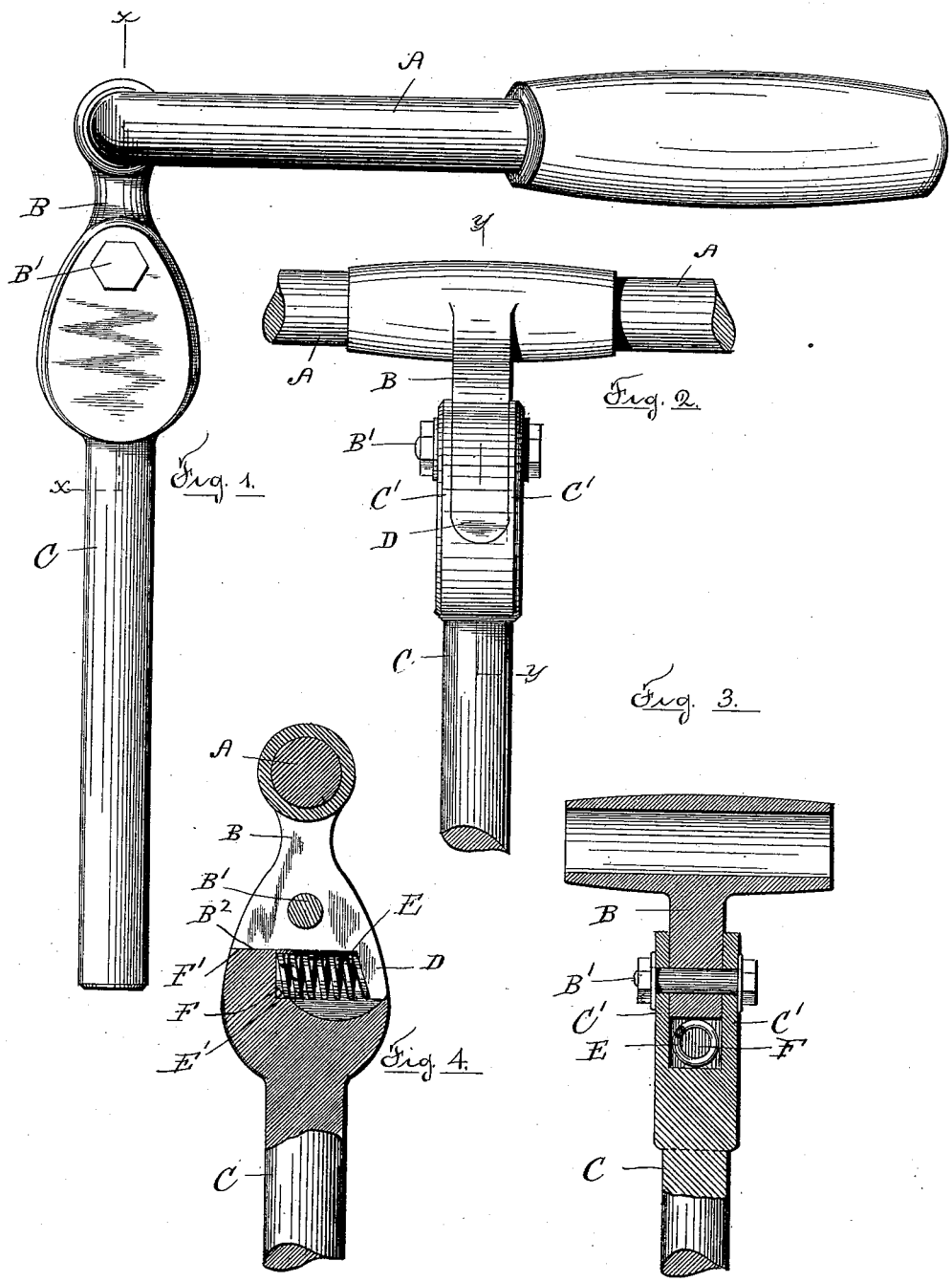
Witnesses
Walter S. Bowen
Clara A. Blake
Inventor
Andrew Fyrberg
By his Attorney
Rufus B. Fowler.

UNITED STATES PATENT OFFICE.

ANDREW FYRBERG, OF WORCESTER, MASSACHUSETTS, ASSIGNOR TO IVER JOHNSON, OF SAME PLACE.

BICYCLE.

SPECIFICATION forming part of Letters Patent No. 507,116, dated October 24, 1893.

Application filed January 14, 1891. Serial No. 377,778. (No model.)

*To all whom it may concern:*

Be it known that I, ANDREW FYRBERG, a citizen of the United States, residing at Worcester, in the county of Worcester and State of Massachusetts, have invented a new and useful Improvement in Bicycles, of which the following is a specification, reference being had to the accompanying drawings, representing that portion of a bicycle which embodies my invention.

My invention relates to the construction and arrangement of a spring connection between the handle of the bicycle and the steering post for the purpose of relieving the hand from vibration or jar and in the accompanying drawings I have represented only such portions of the handle and steering post as are necessary to illustrate the nature of my invention.

Figure 1 represents a side view of a bicycle handle and showing its connection with the steering post. Fig. 2 represents a rear view of the connection between the handle and the steering post. Fig. 3 denotes a central sectional view on line X, X, Fig. 1, and Fig. 4 denotes a central view on line Y, Y, Fig. 2.

Similar letters refer to similar parts in the different figures.

A denotes the transverse cross bar forming the handle bar of the bicycle and which is fixed in and supported by the arm B, which is pivoted at B', in the forked end of the spindle C. The spindle C, is adjustably supported in the steering post in the usual manner and the upper end is provided with the flat and expanded prongs C', C', forming a forked end to receive the lower portion of the pivoted arm B. The arm B, is pivoted upon a bolt B', held in the forked end of the spindle C, and is provided upon its lower and rear side with the prong D, which rests against a spring E, held within a socket E', in the spindle C, the tension of the spring being exerted between the wall F, and the prong E, to rock the arm B, upon the bolt B', and hold the surface B², against the surface F'.

As the transverse handle bar A, is bent at each end to the rearward in the usual manner any pressure applied upon the handles of the bicycle will be exerted in a vertical plane to the rear of the steer post and spindle C, and thereby cause the arm B, to rock upon the bolt B', compressing the spring E, and any vibration or jar upon the handle bar of the bicycle will therefore be received by the spring E. The opposing surfaces B², and F', form a positive stop to limit the action of the spring E, and form a rigid connection between the arm B, and the spindle C, to receive any lifting strain upon the handles A'. The upper and forked end of the spindle C, is expanded to receive the socket for the spring E, and the lower end of the arm B, is expanded to correspond in shape with the forked end of the spindle with the prong D, extended over the end of the spring E, so as to fill the space between the sides C', C', of the forked spindle C. The device therefore presents a solid appearance to the eye there being no opening from without to the interior socket E', and the spring E, is entirely concealed from view.

I am aware that an arm, carrying a handle bar, has been pivoted to the steering post and a spring interposed between said arm and the steering post, in order to lessen the vibration upon the handle bar, and I do not claim such broadly.

What I claim as my invention, and desire to secure by Letters Patent, is—

The combination with the spindle C, of the flat and expanded prongs C', C', forming a forked end to said spindle, a wall F between said expanded prongs, a bolt B' held by said prongs, an arm B pivoted on said bolt, a bent handle bar carried by said arm, a prong D extending downward from said arm and filling the space between said prongs C', C', said prongs C', C' wall F and prong D inclosing a chamber to receive a spring, opposing surfaces B² and F' on said arm B and said wall, F, respectively, and a spring inclosed in said chamber and operating to hold said opposing surfaces in contact, substantially as described.

Dated at Worcester, in the county of Worcester and State of Massachusetts, this 11th day of December, 1890.

ANDREW FYRBERG.

Witnesses:
RUFUS B. FOWLER,
H. W. FOWLER.